(12) United States Patent
Robinson et al.

(10) Patent No.: US 6,690,792 B1
(45) Date of Patent: Feb. 10, 2004

(54) ACTIVE DECOUPLING AND POWER MANAGEMENT CIRCUIT FOR LINE-POWERED RINGING GENERATOR

(75) Inventors: Steven M. Robinson, Madison, AL (US); Jeffrey K. Taylor, Arab, AL (US); John B. Wilkes, Jr., Harvest, AL (US); John S. McGary, Petersburg, TN (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/442,299

(22) Filed: Nov. 19, 1999

(51) Int. Cl.[7] .................................................. H04M 3/00
(52) U.S. Cl. .................. 379/418; 379/413.01; 379/324; 379/323
(58) Field of Search .......................... 379/399.01, 412, 379/413, 372, 324, 322, 348, 350, 382, 418, 413.01, 323

(56) References Cited

U.S. PATENT DOCUMENTS

| | | | | |
|---|---|---|---|---|
| 4,612,417 A | * | 9/1986 | Toumani | 379/412 |
| 4,656,659 A | * | 4/1987 | Chea, Jr. | 379/253 |
| 5,260,996 A | | 11/1993 | Dillon et al. | 379/418 |
| 5,289,359 A | | 2/1994 | Ziermann | 363/21 |
| 5,321,596 A | * | 6/1994 | Hurst | 379/418 |
| 5,539,805 A | | 7/1996 | Bushue et al. | 379/361 |
| 5,600,713 A | | 2/1997 | Chen | 379/375 |
| 6,115,469 A | * | 9/2000 | Dalal et al. | 379/418 |

* cited by examiner

Primary Examiner—Rexford Barnie
(74) Attorney, Agent, or Firm—Allen, Dyer, Doppelt, Milbrath & Gilchrist, P.A.

(57) ABSTRACT

A ringing voltage power management circuit is configured to extract an isolated high-value intermediate voltage from a central office powered digital subscriber line through a current limiting circuit, and to charge a storage capacitor that serves as an energy reservoir for the ring generator of a subscriber line circuit. The storage capacitor and the current limiting circuit isolate the peak power drawn by the ringing load from the telephone line and translate the ringing signal's (20 Hz) ripple to the sub-Hz oscillations of the ringing cadence.

20 Claims, 2 Drawing Sheets

US 6,690,792 B1

ACTIVE DECOUPLING AND POWER MANAGEMENT CIRCUIT FOR LINE-POWERED RINGING GENERATOR

FIELD OF THE INVENTION

The present invention relates in general to communication circuits, and is particularly directed to a ringing voltage power management circuit. The ringing voltage power management circuit is configured to extract an isolated high-value intermediate voltage from a central office powered digital subscriber line through a current limiting circuit, and to charge a storage capacitor that serves as an energy reservoir for the ring generator of a subscriber line circuit. The storage capacitor and the current limiting circuit isolate the peak power drawn by the ringing load from the telephone line and translate the ringing signal's 20 Hz ripple to the sub-Hz oscillations of the ringing cadence (ring on/off cycle).

FIELD OF THE INVENTION

Digital subscriber line (DSL) services are frequently used to deliver POTS (plain old telephone service) and digital data over a single pair of telephone wires. A common implementation is for DSL terminals to be installed in the central office and near the customer site (remote terminal), with power for the remote terminal (RT) being supplied over the DSL line pair from the central office terminal (COT). Because the POTS ringing voltage is not delivered over the DSL line, the ringing voltage must be generated at the remote terminal, which creates two problems.

First, the peak power demand of the ringing voltage can limit the deployment range of the RT, as the resistance of the telephone line limits the amount of power that can be delivered to the RT for a fixed COT line voltage. The more power drawn by the RT, the shorter the maximum possible line length for its deployment. The only options to increase deployment range are to increase the COT line voltage or reduce the peak power demands of the RT. Safety considerations and standards mandate limiting COT line voltages, so that power management in the form of peak power limiting of the RT is essential.

The second problem is the fact that noise associated with the generation of the ringing voltage can mix with the DSL signal, causing significant performance problems of the digital circuits. Some DSL systems are very sensitive to ringing voltage ripple, because the 20 Hz ring frequency is high enough to interfere with the signal, yet too low for the analog or digital filters of the signal path to attenuate. Passive power filtering between the RT input and the ringing generator requires a relatively physically large circuit and may not be practical, because of the low frequency and the amount of attenuation required. For a 50 Vrms ringing voltage, 80–100 dB of attenuation may be required at 20 Hz.

SUMMARY OF THE INVENTION

In accordance with the present invention, both of these problems are effectively solved in a cost and space-efficient manner, by a ringing voltage power management circuit, that is configured to generate an isolated high-value voltage from the line power through a current limiting circuit, and use this isolated high-valued voltage to charge a storage capacitor that serves as an energy reservoir for the ringing voltage generator. The storage capacitor and the current limiting circuit isolate the peak power drawn by the ringing load from the telephone line RT input and translate the 20 Hz ripple to the sub-Hz oscillations of the ringing cadence (ring on/off cycle).

Pursuant to a preferred embodiment of the invention, respective currents flowing in secondary transformer windings of a main DC-DC converter are rectified and smoothed by diode-capacitor pairs to provide a relatively high isolation voltage (e.g., 200 VDC) for charging the storage capacitor, and a bias voltage for a pulse width modulator of a buck pre-regulator. The relative large magnitude isolation voltage is coupled to the storage capacitor through a current limiting circuit. The buck pre-regulator converts the voltage across the storage capacitor into a DC ringing rail voltage coupled to a voltage input port of the SLIC, which generates the ringing voltage. The pre-regulator contains a pulse width modulator (PWM) control circuit, that is switched on and off at a frequency considerably higher than the ring frequency. The PWM control circuit is coupled to the gate of a MOSFET switch, which has its drain-source path coupled with the storage capacitor and an output LC filter.

In response to the MOSFET switch being gated on by the modulation waveform generated by the PWM control circuit, current flows out of the storage capacitor through the MOSFET and the LC filter into the SLIC and returns via the ringing voltage rail. When the MOSFET is switched off, the ringing rail voltage is supplied by the discharging of the output LC filter. The output voltage is regulated by the duty cycle of the PWM modulation of the MOSFET. The ringing rail voltage (the buck pre-regulator output) is equal to the voltage across storage capacitor multiplied by the duty cycle of the PWM waveform.

When the ringing voltage control signal disables the ringing output of the SLIC, there is no load on the current limiting circuit, and the storage capacitor is charged up to approximately the high valued isolation voltage. When ringing is enabled, current is supplied to the buck pre-regulator from the current limit circuit and the storage capacitor. Additional current is drawn from the storage capacitor by the buck pre-regulator. As the storage capacitor discharges, its output is monitored via a feedback control path from a voltage divider, and the buck pre-regulator control circuit increases the duty cycle D of its PWM output waveform, so as to maintain a constant ringing voltage to the SLIC. During the six second ring interval, the current delivered by the isolation voltage never exceeds the value set by the current limit circuit, so that the power delivered over duration of the ringing period is constant.

DETAILED DESCRIPTION

Figure 1:
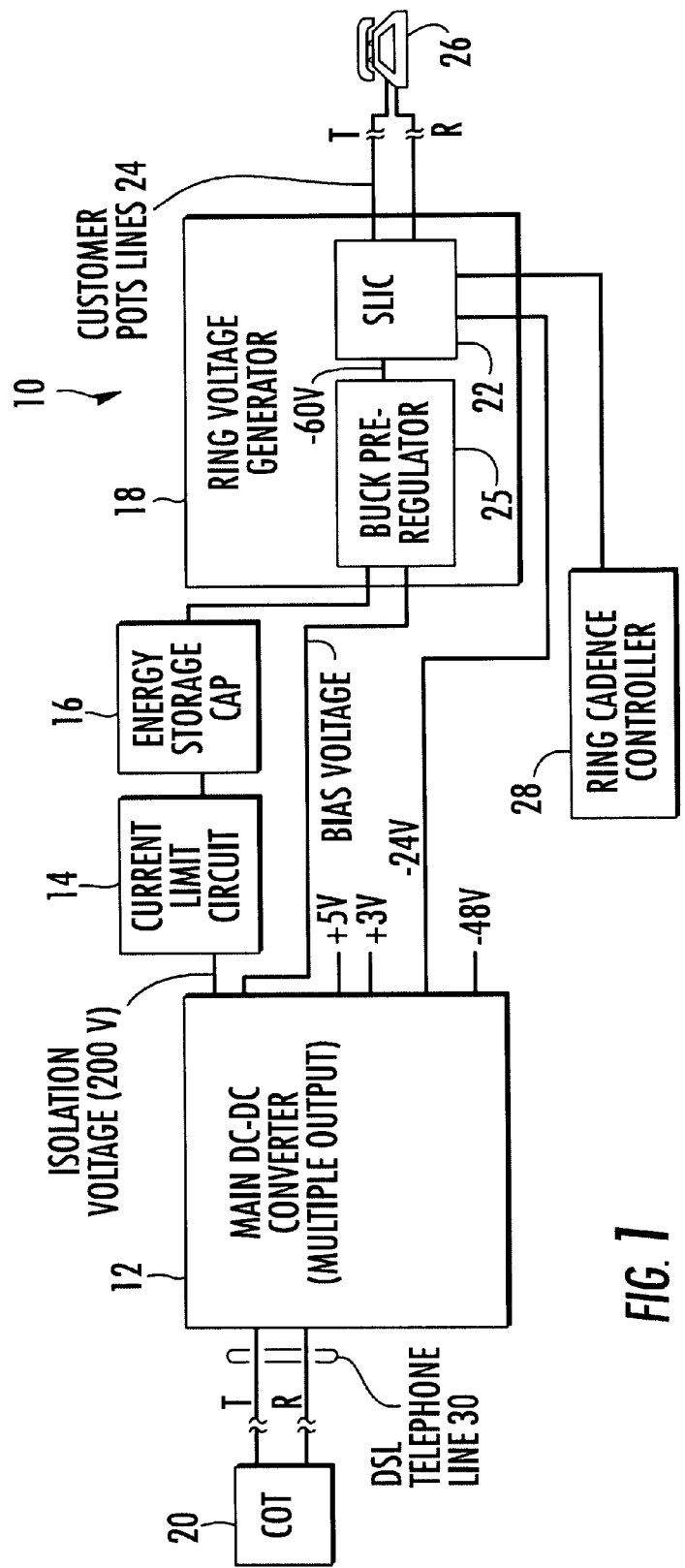
FIG. 1 is a block diagram of a ringing voltage power management circuit in accordance with the present invention.

Referring now to FIG. 1, which is a block diagram of a non-limiting embodiment of the invention, power for a remote terminal (RT) 10 serving customer premises equipment is supplied by way of a remotely powered DSL telephone line pair 30. The DSL line pair is coupled to a span power supply located within a central office terminal (COT) 20, and also provides the DSL signal from the COT. Within the remote terminal, the DSL line pair is coupled to a main DC-DC converter 12, which is operative to convert the COT-sourced span voltage to a plurality of usable voltages including +5 V, +3 V, −24 V, and −48 V. The main DC-DC converter 12 also outputs a 200 V isolation voltage, and a 12 V bias voltage.

The 200 V isolation voltage is coupled to a current limiting circuit 14 to a ringing voltage storage capacitor 16, which serves as the power supply for a ring voltage generator 18. Pursuant to a non-limiting, but preferred embodiment, the ringing voltage may comprise a 20 Hz, 45 Vrms, trapezoidal waveform generated by a subscriber line interface circuit (SLIC) 22. The SLIC 22, which is coupled over a local subscriber loop 24 to a subscriber's POTS phone 26, requires a constant −60 VDC input during ringing, and −24 VDC when not ringing (on or off hook). The −60 VDC ringing rail voltage is derived by way of a buck pre-regulator 25 that converts the voltage across the storage capacitor 16 into the required the −60 VDC voltage. The 12 V bias voltage from the main DC-DC converter 12 is used to power control and drive circuits within the buck pre-regulator 25. A ring cadence controller 28 is operative to turn the ringing voltage for the SLIC 22 on and off, in accordance with the cadence of the ringing voltage (typically two seconds on and four seconds off).

During times when the customer's telephone 26 is not ringing, virtually no load is pulled from the buck pre-regulator 25, so that the storage capacitor 16 is charged up to the value of the (200 V) isolation voltage provided by the main DC-DC converter 12. Once the capacitor 16 has been fully charged to this high valued isolation voltage, current drawn from the isolation voltage output of the main DC-DC converter 12 becomes negligible and the input power to the remote terminal is at its normal, 'non-ringing' level. The use of a relatively high isolation voltage (e.g., 200 V) takes advantage of the squared relationship between voltage and energy in a capacitor (that is, energy=½ $CV^2$, where C is capacitance and V is voltage), and allows the use of a practical size and valued storage capacitor.

When ringing is initiated, the voltage required will cause the current load on the isolation voltage output of the main DC-DC converter 12 to exceed the limit value of the current limiting circuit 14. During this active ringing interval, the current limiting circuit 14 provides its maximum output current; in addition, the capacitor 16 is discharged to make up the deficit required by the SLIC, causing the voltage across the capacitor 16 to decrease to a minimum voltage level. The buck pre-regulator 25 maintains its −60 VDC output as the voltage across the capacitor 16 decreases. The capacitor 16 is sized to provide sufficient energy to maintain the output of the buck pre-regulator 25 within a regulated value during the two second active/on interval of the ringing cadence.

The current limiting circuit 12 is configured to enable the capacitor 16 to be recharged during in the four second inactive/off portion of the (six second) ring cadence. Namely, the current limiting circuit 12 is sized to provide the average amount of ringing current delivered during the six second ring interval. As a consequence, the isolation voltage output of the main DC-DC converter 12 supplies only the average power required by the ringing function during the ring period. The 20 Hz component of the ringing voltage signal is supplied by the capacitor 16 and isolated from the main DC-DC converter 12 by the very high impedance of the current limit circuit 14.

As a result, during ringing of the customer's telephone, the DSL telephone line 30 delivers normal RT operating power plus the average power required by the customer's phone (including circuit performance inefficiencies). The 20 Hz variations in the ringing current are nearly completely decoupled from the RT input and converted to the sub-Hz on/off modulation of the ring cadence. Also, peak power demand during the two second ringing interval is integrated over the full six second ringing period, so as to minimize the loss of DSL line deployment due to line voltage drop.

Figure 2:
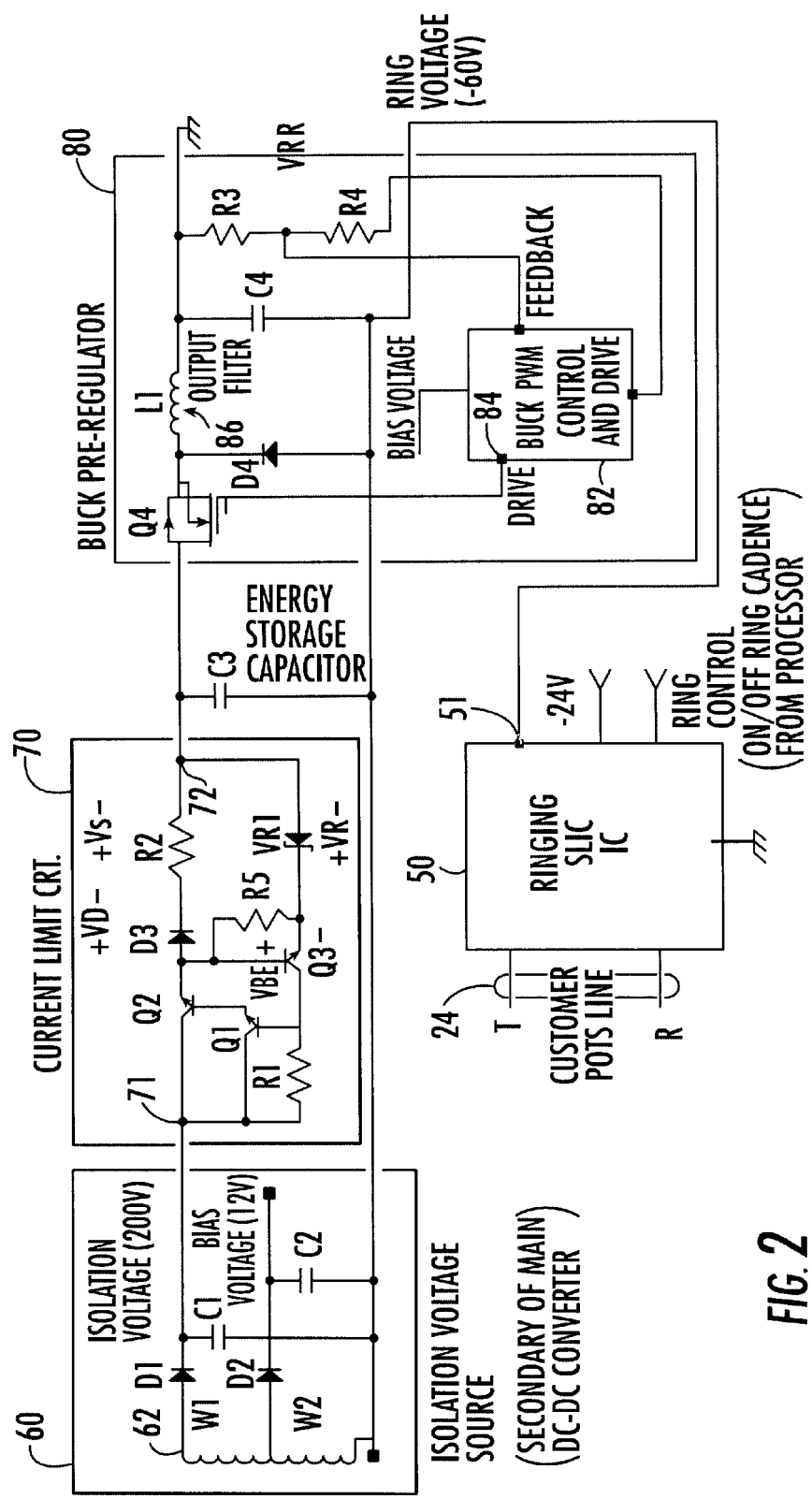
FIG. 2 is a schematic diagram of a non-limiting, preferred embodiment of the invention in the block diagram of FIG. 1.

FIG. 2 is a schematic diagram of a preferred embodiment of the invention shown in the block diagram of FIG. 1. As shown in FIG. 2, the isolation voltage is derived by means of the secondary transformer winding 62 of a main DC-DC converter 60, a primary winding of which (not shown) is coupled to the DSL line from the COT. Current flowing in respective winding portions W1 and W2 of the secondary transformer winding 62 is rectified and smoothed by diode-capacitor pairs D1-C1 and D2-C2, respectively, to provide the isolation voltage (200 VDC) and the bias voltage (12 VDC).

The (200 VDC) isolation voltage provided by the diode-capacitor pair D1-C1 is coupled to the input port 71 of a current limit circuit 70. Input port 71 is coupled to the collectors of a Darlington-connected bipolar transistor pair Q1-Q2. A resistor R1 is coupled between input port 71 and the base of transistor Q1 and serves to supply base current to transistor Q1, and thereby to the base of transistor Q2. The emitter of transistor Q2 is coupled through diode D3 and resistor R2 to an output port 72 to which a storage capacitor C3 is coupled. A further bipolar transistor Q3 has its base coupled to the emitter of transistor Q2 and its collector coupled to the base of transistor Q1. A resistor R5 is coupled across the base and emitter of transistor Q3. The emitter of transistor Q3 is coupled through a Zener diode VR1 to the current limiter circuit's output port 72.

When the voltage across the storage capacitor C3 is less than the isolation voltage supplied to input port 71, resistor R1 supplies base current to the transistor Q1 which, in turn, supplies base current to transistor Q2. The resulting emitter current through transistor Q2 flows mainly through the diode D3 and the resistor R2, to charge capacitor C3 and thereby provide power for a buck pre-regulator 80. The current $I_S$ through diode D3 and resistor R2 create respective voltage drops $V_D$ and $V_S$ thereacross. This combined voltage drop is reflected as a voltage $V_{BE}$ across the base-emitter junction of transistor Q3 and the voltage reference Zener diode VR1.

In response to the voltage across the Zener diode VR1 becoming equal to its breakdown voltage $V_R$, Zener diode VR1 conducts and current is drawn through the base-emitter junction and thus the collector of transistor Q3, thereby robbing current from the base of transistor Q1. The reduction in base current to transistor Q1 reduces the base current of transistor Q2 and thus its emitter current. In this way, current is limited through the current limiting circuit 70. The current limit value $I_s$ of current limiting circuit is given approximately by the relationship:

$$I_S=(V_R+V_{BE}-V_D)/R2$$

Since $V_{BE}$ and $V_D$ are approximately equal and have similar temperature coefficients, the limited current $I_S$ is mainly a function of $V_R$ and R2.

A buck pre-regulator 80 serves to convert the voltage across the storage capacitor C3 into a ring rail voltage (−60 V) that is coupled to a voltage input port 51 of a SLIC IC 50, which generates the ringing voltage. The pre-regulator 80 contains a pulse width modulator (PWM) control circuit 82, that is powered by the 12 V bias voltage from the diode-capacitor pair D2-C2 of the main DC-DC converter 60, and is switched on and off at a frequency (e.g., 50 kHz) that is considerably higher than the ring frequency (20 Hz). A drive output port 84 of the PWM control circuit 82 is coupled to the gate of an N-channel MOSFET Q4 the drain-source path of which is coupled in circuit with the storage capacitor C3 and an output LC filter 86, comprising inductor L1 and a filter capacitor C4.

In response to the MOSFET Q4 turning on, current flows from the storage capacitor C3 through MOSFET Q4 and inductor L1 and into capacitor C4 of the output filter 86 and the SLIC IC 50 and returns via the −60 V ring rail. When the MOSFET Q4 is turned off, the ring rail voltage is supplied by the discharging of the output LC filter 86, as current flows out of inductor L1 and capacitor C4 into the SLIC. The current flow return path is to capacitor C4 directly and to inductor L1 through a diode D4. The output voltage is regulated by the duty cycle D (ratio of on-time to off-time) modulation of MOSFET Q4. The ring rail voltage (buck pre-regulator output) is equal to the voltage across storage capacitor C3 multiplied by the duty cycle D (ignoring losses in the buck pre-regulator 80).

When the ring control signal disables the ringing output of the SLIC IC 50, there is virtually no load on the current limit circuit 70, and the storage capacitor C3 is charged up to approximately the isolation voltage (200 V). When ringing is enabled, current is supplied to the buck pre-regulator 80 from the current limit circuit 70 and the storage capacitor C3. Additional current (12 mA average during the two second active/on ringing period) is drawn by the buck pre-regulator 80 than is supplied (8 mA) by the current limit circuit 70. As the storage capacitor C3 discharges, its stored voltage is monitored at a feedback port 83 of control circuit 82 by way of a feedback control path from a voltage divider comprised of resistors R3 and R4. In response to the change (decrease) in stored voltage, the buck pre-regulator control circuit 82 adjusts (increases) the duty cycle D of its PWM output waveform, so as to maintain a constant −60 V ringing rail supply to the SLIC IC 50. During the entire six second ring interval, the current delivered by the isolation voltage never exceeds the value set by the current limit circuit 70, so that the power delivered over duration of the ringing period is constant, as is the power drawn from the DSL line.

As will be appreciated from the foregoing description, the above-discussed problems associated with generating a POTS ringing voltage at a span-powered remote terminal for a DSL line are effectively obviated by means of a ringing voltage power management circuit, that is configured to derive an isolated high-value voltage from the span power through a current limiting circuit, and then use this isolated high-valued voltage to charge a storage capacitor that serves as an energy reservoir for the ringing voltage generator. Advantageously, the storage capacitor and the current limiting circuit isolate the peak power drawn by the ringing load from the telephone line remote terminal input and translate the ringing signal ripple to sub-Hz oscillations of the ringing cadence.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of supplying power to a ring generator for a telecommunication device, comprising the steps of:

(a) coupling said telecommunication device to a telecommunication link that conveys telecommunication signals to and from, and is remotely powered by, a telecommunication facility, wherein instantaneous power supplied from said remotely powered telecommunication link is less than a total power requirement of said telecommunication device and said ring generator during operation of said ring generator;

(b) during intervals other than powering of said ring generator, storing electrical energy from said remotely powered telecommunication link; and (c) during intervals of powering said ring generator, using electrical energy stored in step (b) to augment power supplied from said telecommunication link and realize said total power requirement for ringing operation of said ring generator and operating said telecommunication device without exceeding maximum power available from said telecommunication link.

2. The method according to claim 1, wherein step (b) comprises storing, from said remotely powered telecommunication link, electrical energy that is effective to provide average power required by said ringing generator during a ringing period.

3. The method according to claim 1, wherein step (b) includes decoupling, from said telecommunication link, low frequency ripple noise associated with said operation of said ring generator, so as not to interfere with digital telecommunication signals being conveyed over said telecommunication link during remote powering thereof.

4. The method according to claim 1, wherein step (b) comprises (b1) generating an isolated high-value voltage from electrical energy derived from said remotely powered telecommunication link, and (b2) coupling said isolated high-value voltage generated in step (b1) through a current limiting circuit to an electrical storage device so as to store said electrical energy therein.

5. The method according to claim 4, wherein said ring generator comprises a regulating ring generator to which electrical energy stored in said electrical storage device is coupled in step (c).

6. The method according to claim 4, wherein step (c) comprises controllably coupling electrical energy stored in said electrical storage device to said ring generator by way of a ring generator pre-regulator.

7. The method according to claim 6, wherein said electrical storage device comprises a storage capacitor, and wherein said ring generator pre-regulator is operative to convert a voltage across said capacitor into a ringing rail voltage that is coupled to a subscriber line interface circuit which generates a ringing signal for said telecommunication device.

8. The method according to claim 7, wherein said ring generator pre-regulator includes a pulse width modulator that is operative to control the generation of a voltage for powering said ring generator in accordance with an adjustable duty cycle waveform having a frequency higher than the frequency of said ringing signal.

9. The method according to claim 8, wherein said pulse width modulator is operative to monitor the voltage across said storage capacitor and to adjust the duty cycle of said adjustable duty cycle waveform in accordance therewith, so as to maintain a prescribed voltage to said subscriber line interface circuit.

10. A circuit for powering a ring generator for a telecommunication device using power extracted from a telecommunication link that conveys telecommunication signals and is remotely powered by way of a telecommunication facility, wherein instantaneous power supplied from said remotely powered telecommunication link is less than a total power requirement of said telecommunication device and said ring generator during operation of said ring generator, said circuit comprising an electrical storage device; and an interface circuit coupled in circuit with said telecommunication link and said electrical storage device, and with said electrical storage device and said ring generator, and being operative, during intervals other than powering of said ring generator, to store in said electrical storage device electrical energy derived from said remotely powered telecommunication link and, during intervals of powering said ring generator, to use electrical energy stored in said electrical storage device to augment power supplied from said telecommunication link and realize said total power requirement for ringing operation of said ring generator and operating said telecommunication device without exceeding maximum power available from said telecommunication link.

11. The circuit according to claim 10, wherein said interface circuit is operative to extract from said remotely powered telecommunication link for storage in said electrical storage device, electrical energy that is effective to provide average power required by said ringing generator during a ringing period.

12. The circuit according to claim 10, wherein said interface circuit includes a voltage regulator coupled in circuit with said electrical storage device and said ring generator and being operative to generate said ringing voltage for operating said ring generator.

13. The circuit according to claim 12, wherein said electrical storage device comprises a storage capacitor, and wherein said voltage regulator comprises a ring generator pre-regulator that is operative to convert a voltage across said capacitor into a ringing rail voltage that is coupled to a subscriber line interface circuit which generates a ringing signal for said telecommunication device.

14. The circuit according to claim 13, wherein said ring generator pre-regulator includes a pulse width modulator that is operative to control the generation of a voltage for powering said ring generator in accordance with an adjustable duty cycle waveform having a frequency higher than the frequency of said ringing signal.

15. The circuit according to claim 14, wherein said pulse width modulator is operative to monitor the voltage across said storage capacitor and to adjust the duty cycle of said adjustable duty cycle waveform in accordance therewith, so as to maintain a prescribed voltage to said subscriber line interface circuit.

16. The circuit according to claim 12, wherein said interface circuit is configured to generate an isolated high-value voltage from electrical energy derived from said remotely powered telecommunication link, and includes a current limiting circuit through which said isolated high-value voltage is coupled to said electrical storage device.

17. The circuit according to claim 12, wherein said interface circuit is configured to decouple low frequency ripple noise associated with operation of said ring generator from said telecommunication link, so as not to interfere with digital telecommunication signals being conveyed over said telecommunication link during remote powering thereof.

18. The circuit according to claim 12, wherein said ring generator comprises a regulating ring generator.

19. A remote terminal circuit for powering a ring generator for a telecommunication device using power extracted from a telecommunication link that conveys telecommunication signals and is remotely powered by way of a telecommunication facility, wherein instantaneous power supplied from said remotely powered telecommunication link is less than a total power requirement of said telecommunication device and said ring generator during operation of said ring generator, said circuit comprising an electrical storage device, and an interface circuit coupled in circuit with said telecommunication link and said electrical storage device, and in circuit with said electrical storage device and said ring generator, and being operative, during intervals other than powering of said ring generator, to store in said electrical storage device electrical energy derived from said remotely powered telecommunication link and, during intervals of powering said ring generator, to use electrical energy stored in said electrical storage device to augment power supplied from said telecommunication link and realize said total power requirement for ringing operation of said ring generator and operating said telecommunication device without exceeding maximum power available from said telecommunication link, while decoupling low frequency ripple noise associated with operation of said ring generator from said telecommunication link, so as not to interfere with digital telecommunication signals conveyed over said remotely powered telecommunication link.

20. The remote terminal circuit according to claim 19, wherein said interface circuit is configured to generate an isolated high-value voltage from electrical energy derived from said remotely powered telecommunication link, and includes a current limiting circuit through which said isolated high-value voltage is coupled to said electrical storage device.

* * * * *